United States Patent [19]

Compliment et al.

[11] Patent Number: 5,706,440
[45] Date of Patent: Jan. 6, 1998

[54] METHOD AND SYSTEM FOR DETERMINING HUB TOPOLOGY OF AN ETHERNET LAN SEGMENT

[75] Inventors: Dale Richard Compliment; Thomas Joseph Prorock, both of Raleigh, N.C.

[73] Assignee: International Business Machines Corporation, Armonk, N.Y.

[21] Appl. No.: 518,412

[22] Filed: Aug. 23, 1995

[51] Int. Cl.$^6$ .................................................. G06F 11/30
[52] U.S. Cl. ...................... 395/200.54; 395/200.53; 395/838; 370/401
[58] Field of Search .................. 395/200.11, 800, 395/200.07, 200.09, 200.6, 200.53, 200.54, 200.5, 200.56, 200.68, 200.79, 200.75, 838; 370/401, 409, 419

[56] References Cited

U.S. PATENT DOCUMENTS

| | | | |
|---|---|---|---|
| 5,198,805 | 3/1993 | Whiteside et al. | 340/825.06 |
| 5,226,036 | 7/1993 | Riley et al. | 370/15 |
| 5,226,120 | 7/1993 | Brown et al. | 395/200 |
| 5,276,789 | 1/1994 | Besaw et al. | 395/140 |
| 5,295,244 | 3/1994 | Dev et al. | 395/161 |
| 5,539,725 | 7/1996 | Trubey et al. | 370/13 |
| 5,588,119 | 12/1996 | Vincent et al. | 395/200.15 |

FOREIGN PATENT DOCUMENTS

| | | |
|---|---|---|
| 0123231 | 5/1991 | Japan. |
| 5136793 | 6/1993 | Japan. |
| 5136794 | 6/1993 | Japan. |

OTHER PUBLICATIONS

E. Decker et al, "Definitions of Managed Objects for Bridges", Cisco Systems, Inc., RFC1286, Dec. 1991, pp. 1–40.

Gandalf's Enterprise Specific SMMP MIB, Gandalfis Enterprise, Jan. 2, 1992, pp. 1–48.

http://smurfload.cit.buffalo.edu/ftp/pub/mibs/gandolf/gandolf Hewlet–Packard hub–mib definitions.

http://smurfland.cit.buffalo.edu/ftp/pub/mibs/hp–hub/hub-.mib Nov. 28, 1994 pp. 1–27.

*Primary Examiner*—Mehmet B. Geckil
*Attorney, Agent, or Firm*—Felsman, Bardley,Gunter& Dillon; John J. Timar

[57] ABSTRACT

A method and system of determining a LAN bus segment hub topology is provided. Each of a plurality of hubs attached to a LAN bus segment is identified by a network management station, wherein each hub includes a plurality of identifiable ports. A connection table is generated in association with each of the plurality of hubs by the hub's agent, wherein the connection table associated with a selected hub lists all remaining hubs of the plurality of hubs and an identifiable port of the selected hub through which each remaining hub of the plurality of hubs communicates with the selected hub. Last, a single correlation table is generated from the generated connection tables by merging the associated connection tables for all identified hubs indicating whether each hub attached to the LAN bus segment has a direct or an indirect connection with every remaining hub of the plurality of hubs.

18 Claims, 10 Drawing Sheets

METHOD AND SYSTEM FOR DETERMINING HUB TOPOLOGY OF AN ETHERNET LAN SEGMENT

BACKGROUND OF THE INVENTION

1. Technical Field

The present invention relates in general to methods and systems for determining bus network topology, and in particular to methods and systems for determining hub connection topology on Ethernet LANs.

2. Description of the Related Art

Determining the connection topology of a network is important to both users and managers of networks. Most Network Management applications, including NETVIEW/6000 produced by International Business Machines Corporation, have the capability of providing an output, such as a video display, graphically depicting the network topology to the network manager or user. Until now, network management applications have been unable to accurately display the network topology of Ethernet LAN segments. The bus structure of the Ethernet LAN does not allow the Network Manager a means to determine the actual interconnection or topology of devices on an Ethernet LAN segment. Currently, Network Managers can only determine that specific devices exist on the same LAN segment, but cannot determine how the devices are actually interconnected. On other LANs, such as Token Ring and FDDI, determining the actual interconnection is not a problem because the upstream neighbor address information from architected MAC (Medium Access Control) frames or NIF (Neighbor Information Frames) frames can be used to build the topology ring map. These types of frames and the concept of nearest upstream neighbor do not exist on Ethernet and this problem must be solved via other methods.

The problem of determining Ethernet LAN topology is further complicated when Ethernet hubs/repeaters are connected via the 10BaseT ports in a cascaded fashion, such that a first hub is connected to the 10BaseT port of a second hub which is attached to the backbone bus of the Ethernet LAN segment via an attachment unit interface (AUI). Standard network management applications can only identify that the hub/repeaters are logically connected at the same Ethernet segment, but they cannot determine the exact physical connections of these hub/repeaters that have a cascaded connection to the backbone bus. In the prior art, this problem has been solved by checking the number of times the source address of transmitted frames has changed on a given port. If the number of source addresses changes very rapidly over a given period of time, then it is inferred that a hub/repeater is attached to the port. It will be appreciated that this method is not deterministic and has a dependency on network activity. For example, this method is not reliable since a hub/repeater could be connected to a 10BaseT port of another hub/repeater, but if all the workstations connected to the cascaded hub are powered off, or idle, then the true connection topology cannot be detected. Utilizing port activity to determine connection topology is a best-guess at the network interconnection based on the traffic, or frame activity, on a given port and is not deterministic. What is needed is a deterministic method and system to detect the presence of hubs attached to the 10BaseT ports of the hub/repeater. Further, such a method and system would determine connection topology even in periods of no LAN activity.

SUMMARY OF THE INVENTION

According to the present invention, a method and system of determining a LAN bus segment hub topology is provided. Each of a plurality of hubs attached to a LAN bus segment is identified by a network management station, wherein each hub includes a plurality of identifiable ports. A connection table is generated in association with each of the plurality of hubs by the hub's agent, wherein the connection table associated with a selected hub lists all remaining hubs of the plurality of hubs and an identifiable port of the selected hub through which each remaining hub of the plurality of hubs communicates with the selected hub. Last, a single correlation table is generated from the generated connection tables by merging the associated connection tables for all identified hubs indicating whether each hub attached to the LAN bus segment has a direct or an indirect connection with every remaining hub of the plurality of hubs.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
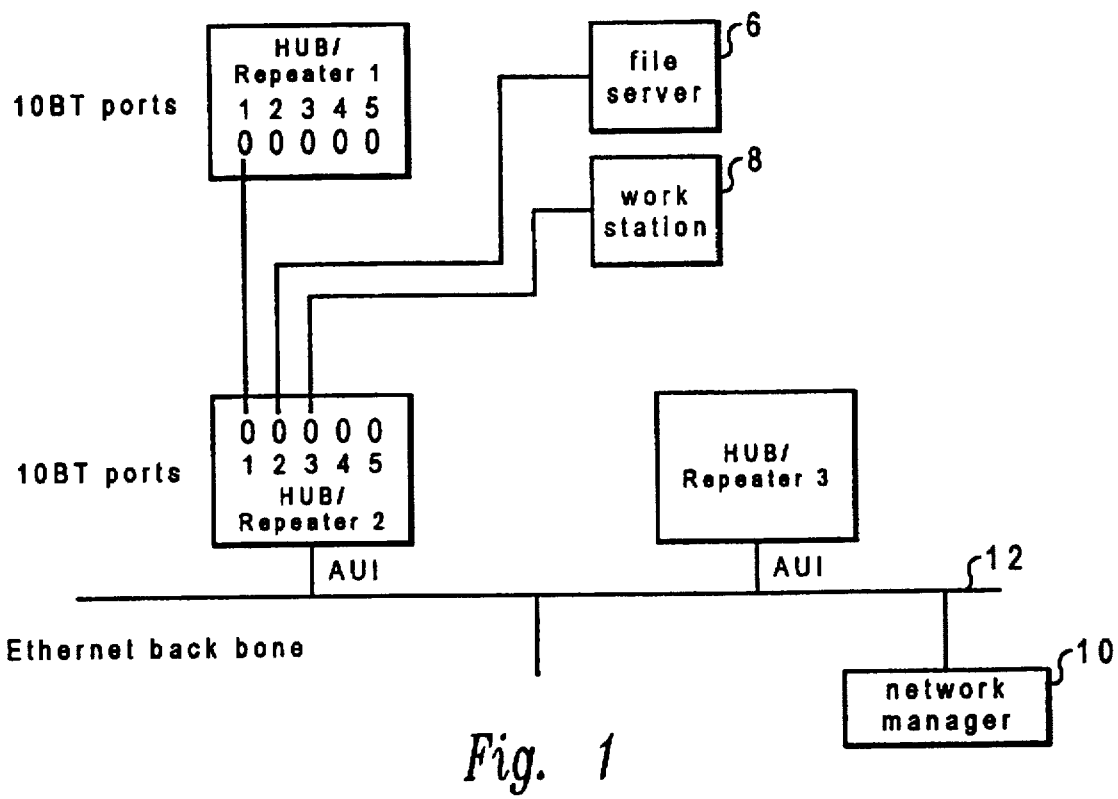
FIG. 1 depicts an Ethernet LAN segment utilizing the method and system of determining Ethernet LAN segment topology, according to a preferred embodiment of the present invention.

The present invention utilizes currently available capabilities of Network Management applications and compatible network hubs to establish the connection topology of an Ethernet LAN segment. The preferred embodiment of the present invention is dependent upon the capabilities of the Simple Network Management Protocol (SNMP), management information supplied from a Network Manager such as IBM's NETVIEW/6000, and the capabilities of the AMD Ethernet repeater chip set.

The SNMP provides the ability to supply standardized management information between connected nodes. The SNMP also allows the ability for enterprises to add customized vendor specific management information. The SNMP management information is exchanged between connected nodes via "get" and "set" frames. Within the SNMP RFC 1157 standard, the following vendor specific MIB (Management Information Base) extensions are added to the MIB and defined:

8224HubTable
8224HubTableControlEntry
8224PortTopologyTable.

The ASN.1 definitions for these new vendor specific MIB extensions are given in the Appendix.

The process of determining Ethernet LAN segment topology for the present invention involves three phases: Network Manager Phase, Hub Discovery Phase, and Connection Correlation Phase. With reference now to the figures, and in particular with reference to FIG. 1, there is depicted an Ethernet LAN segment utilizing the method and system of determining Ethernet LAN segment topology, according to a preferred embodiment of the present invention. Network manager 10 is a computer attached to the Ethernet bus or backbone 12 and manages the network communications between hub/repeaters 1, 2 and 3. The preferred hub is the IBM 8224 Ethernet Managed Hub. Both hub 2 and hub 3 are connected to the backbone 12 via an attachment unit interface (AUI). Hub 1, however, is attached to backbone 12 through a 10BaseT port of hub 2.

Every hub has a number of 10Base Tports through which it communicates with attached devices. As shown in FIG. 1, hub 1 and hub 2 each have five 10BaseT ports. In the configuration shown therein, hub 1 has its port 1 connected to port 1 of hub 2. When hub 1 communicates over the network, messages are passed through this port-to-port connection with hub 2. Hub 2 then repeats communications to/from hub 1 on backbone 12 via its AUI. Also connected to hub 2 are file server 6 connected at port 2, and workstation 8, connected to port 3.

The network management station 10 performs a node discovery process to determine the number of Ethernet hubs and their associated IP and MAC addresses attached to a particular Ethernet LAN segment, for example the segment shown in FIG. 1. Such a node discovery process is standard for known network management stations and it produces a listing of all nodes attached to the network. Network management station 10 downloads a subset of the listing as a table listing each of the hub/repeaters attached to a particular Ethernet LAN segment, and each of the hub's IP and MAC addresses. This HubTable is downloaded to a SNMP Agent that resides in each of the Ethernet LAN segment hubs (hubs 1–3). Such an SNMP Agent is standard in Ethernet managed hubs, for example, in the IBM 8224 Ethernet Managed Hub, and its function is to execute all SNMP frames under the SNMP protocol that are received by the hub over the network.

The Hub Discovery Phase is performed by the SNMP Agent in each of the Ethernet LAN segment hubs. So, for example, each of the hubs 1–3 would separately perform its own Hub Discovery Phase. The network management station 10 sets the SNMP MIB extension HubTableControlEntry to a "StartDiscovery" to indicate that the Hub Discovery Phase is about to be initiated. The SNMP Agent in the first hub writes the MAC address from the first entry in the HubTable into the Source Address Match Register of the Repeater Chip Set of the hub and enables the Source Address Match interrupt. A Source Address Match interrupt is produced by the Repeater Chip Set when a frame is received by the hub that is addressed from a device matching the address contained in the Source Address Match Register. In addition, the Source Address Match interrupt indicates which port of the hub received the frame that caused the interrupt. This interrupt capability is currently available on the AMD Corporation Ethernet Repeater Chip Set, which is included in the IBM 8224 Ethernet Managed Hub.

The SNMP Agent then transmits a management frame to the MAC address of the first entry in the HubTable. When the Hub responds with a response frame, a source address match interrupt will occur because the response frame contains the MAC address of the responding hub. This MAC address will be the same address loaded into the Source Address Match Register and, accordingly, will cause the Source Address Match Interrupt. From the interrupt, the SNMP Agent can then determine which of the 10Base T ports caused the interrupt and therefore the port over which the addressed hub communicated with the Agent. The SNMP Agent then loads this information into a connection table (listed in the MIB as the 8224 PortTopologyTable) listing the hub corresponding to the MAC address and the port over which its response frame was communicated.

The SNMP Agent then proceeds by completing the discovery phase on each of the remaining entries of the HubTable. This generates a connection table for the SNMP Agent's hub listing each of the other hubs in the Ethernet LAN segment and the port over which those hubs communicated to the SNMP Agent's hub. This process is then repeated by each agent in every hub of the Ethernet LAN segment until a connection table is generated for each hub.

As an example of the hub discovery process, consider hub 1 in FIG. 1 as the current hub being processed. Hub 1 would receive a list of the IP addresses of the hubs in the segment from the network management station 10 and would build a corresponding HubTable. The SNMP Agent in hub 1 would then send an SNMP request frame to the IP address of hub 2 (assuming that hub 2 is the first entry in the HubTable). When hub 2 sends a response frame, the last source address on port 1 of hub 1 would be the MAC address of hub 2. Because the MAC address of hub 2 would have been loaded into the source Address Match Register, a Source Address Match interrupt on port 1 would occur. Thus, the first entry in the connection table for hub 1 would show hub 2 attached to port 1.

The SNMP Agent in hub 1 would then send an SNMP request frame to the IP address of hub 3. When hub 3 responds with a response frame, the last source address on port 1 of hub 1 would be the MAC address of hub 3. This would generate a Source Address Match interrupt on port 1. The connection table of hub 1 would then be completed by an entry of hub 3 shown as connected to port 1. This process would then be repeated for hubs 2 and 3 so that a connection table is produced for each of those hubs.

Figure 2:
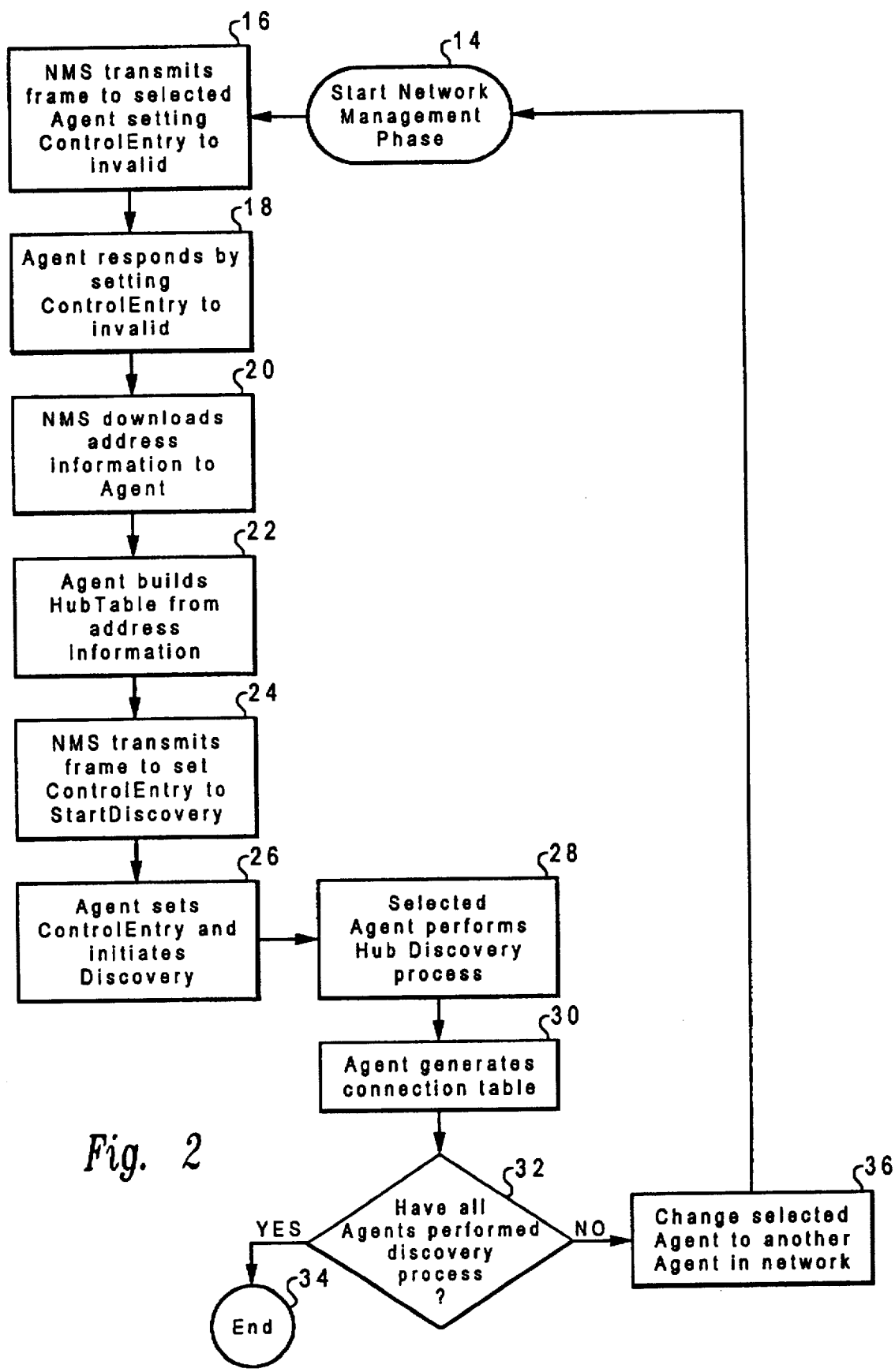
FIG. 2 shows a flow diagram of the steps performed in the network management phase of the present invention.

Referring now to FIG. 2, there is shown a flow diagram of the steps performed in the network management phase of the present invention. The process begins at step 14 where the network management phase is started. At step 16, the network management station (NMS) transmits a management frame setting the HubTableControlEntry to an invalid state (the HubTableControlEntry is defined in the MIB and has four states: unknown, invalid, StartDiscovery, and DiscoveryComplete). At step 18, the SNMP Agent responds to the management frame by setting the HubTableControlEntry to invalid. At step 20, the NMS downloads address information, including the IP and MAC addresses, of all hubs attached to the Ethernet LAN segment. This download to all hubs is accomplished via a SNMP Set Frame. At step 22, the SNMP Agent at each hub then builds a HubTable from the downloaded address information. Also, the SNMP Agent transmits a response frame to the Network Management Station. At step 24, the Network Management Station transmits a SNMP frame to set the state of the HubTableControlEntry to StartDiscovery. In response to this frame, the agent sets the control entry to StartDiscovery and initiates the discovery phase, as shown at step 26.

As shown at step 28, the SNMP Agent for the currently selected hub performs the hub discovery process. This Hub Discovery Phase will be described in detail with respect to FIG. 3 herein below. Once the discovery phase is completed, the agent generates a connection table, as shown at step 30. The generated connection table lists each of the other hubs in the Ethernet LAN segment and the corresponding port over which that hub communicated with the current hub.

The process then proceeds to decision block 32 where it is determined whether all agents in the Ethernet LAN segment have performed the discovery process. If all agents have performed the discovery process, a connection table for each hub has been generated and the process ends at step 34. If not all agents have performed the discovery process, the selected agent is changed to another agent in the network which has not yet performed the discovery process, as shown at step 36. From there, the process branches back to step 14 where the network management phase is repeated for the newly selected agent.

Figure 3:
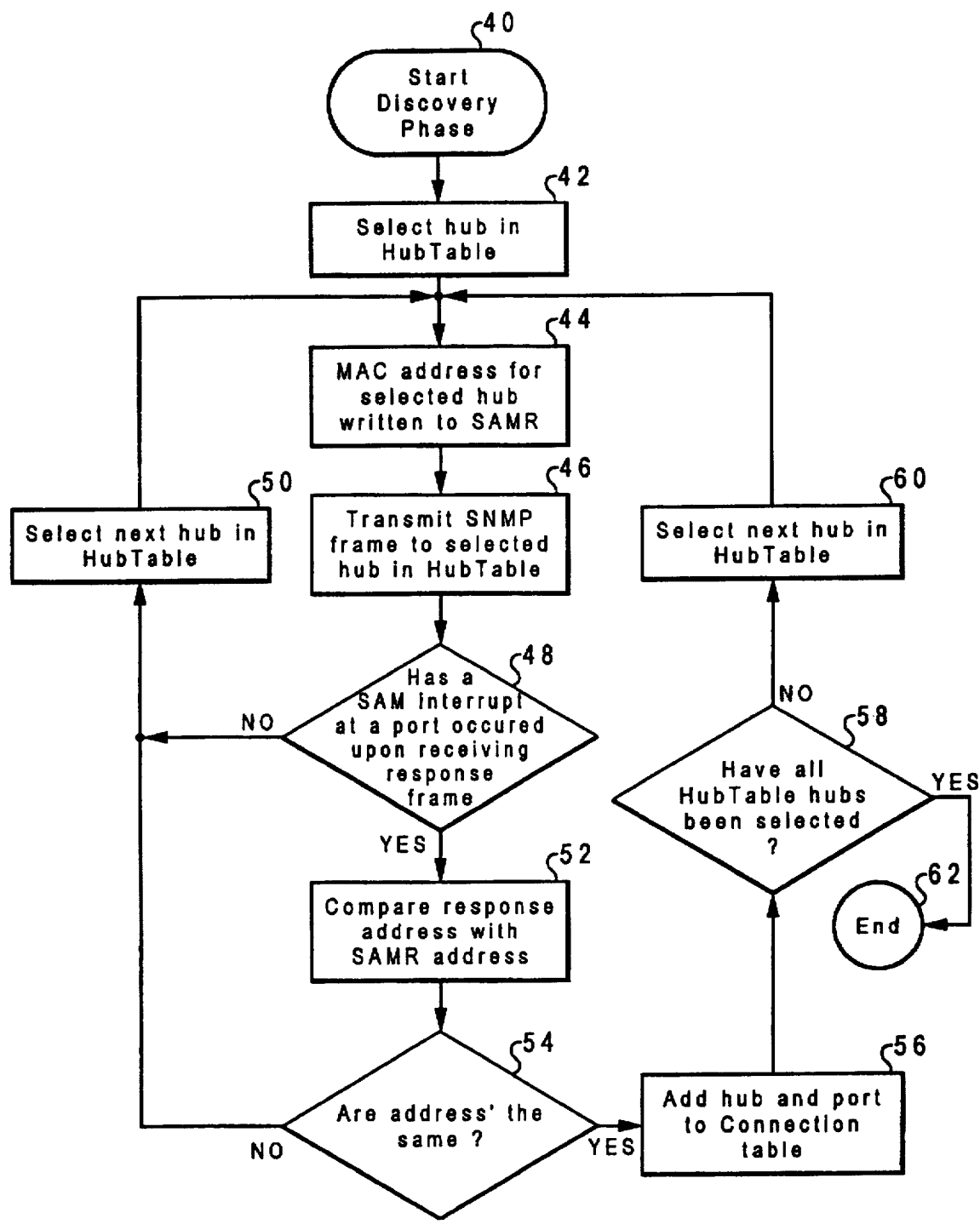
FIG. 3 shows a flow diagram of the steps for performing the discovery phase of the present invention.
Figure 5A:
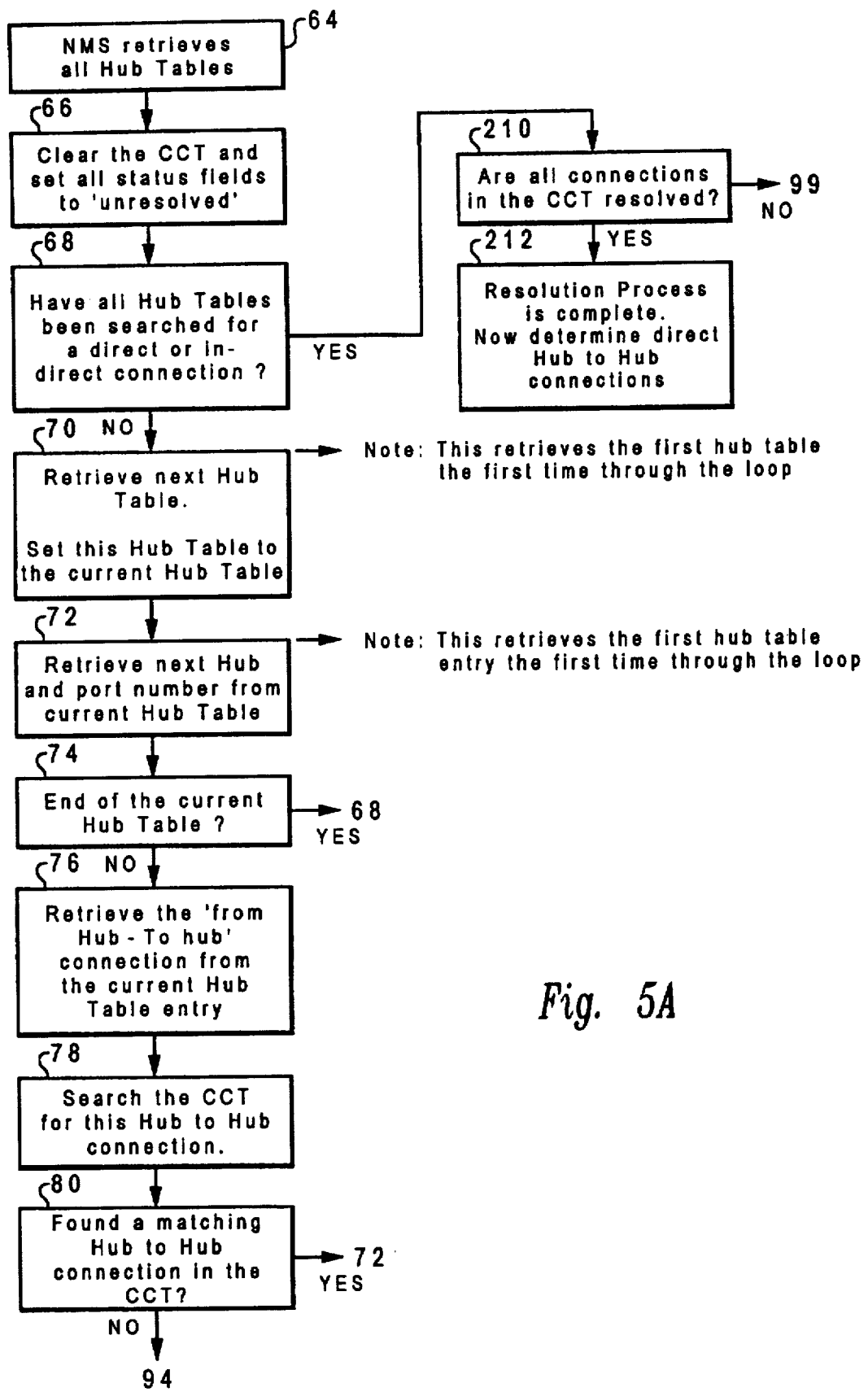
FIGS. 5A–5G show a flow diagram of the process for performing the Connection Correlation Phase of the present invention.
Figure 5B:
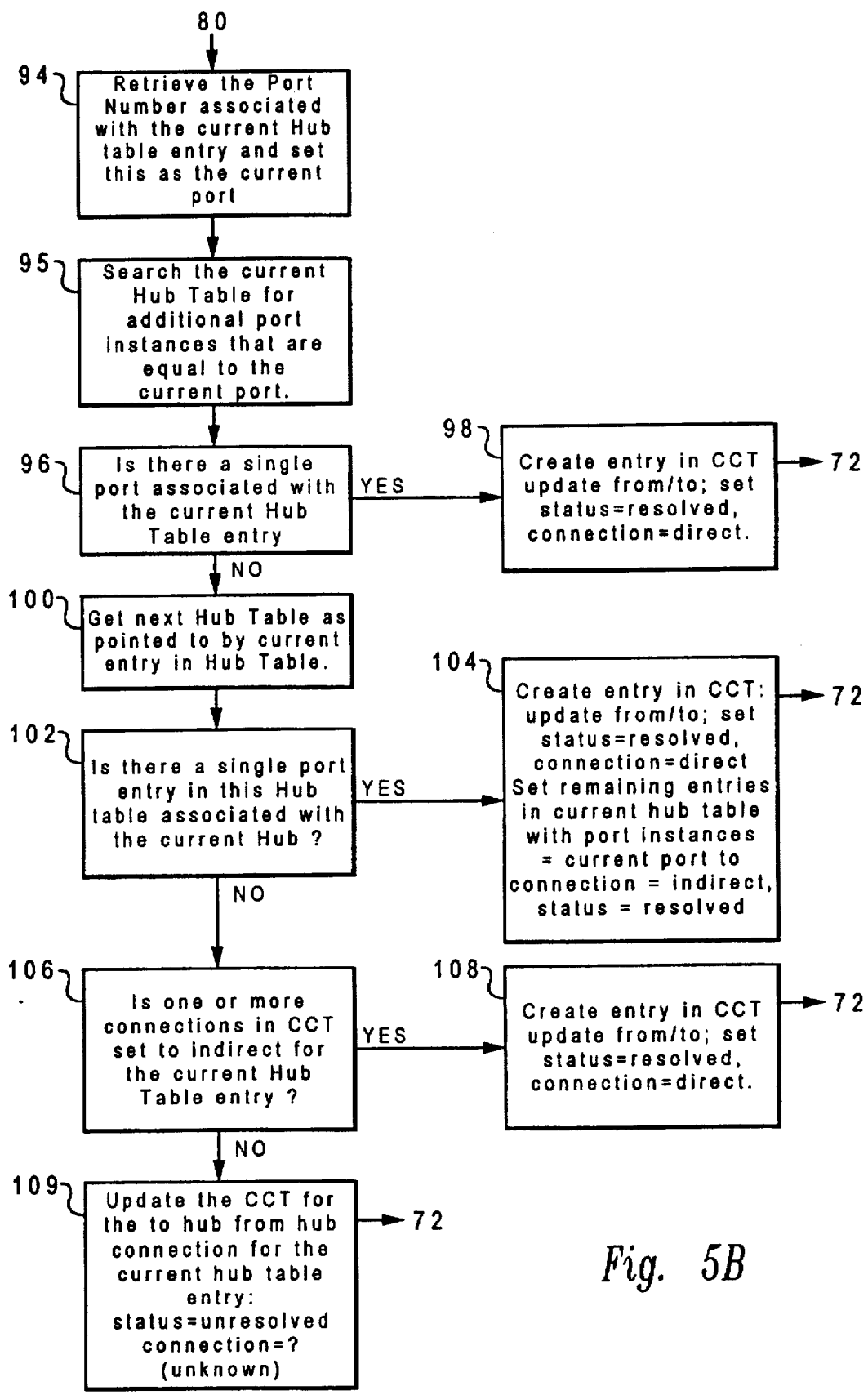
Figure 5C:
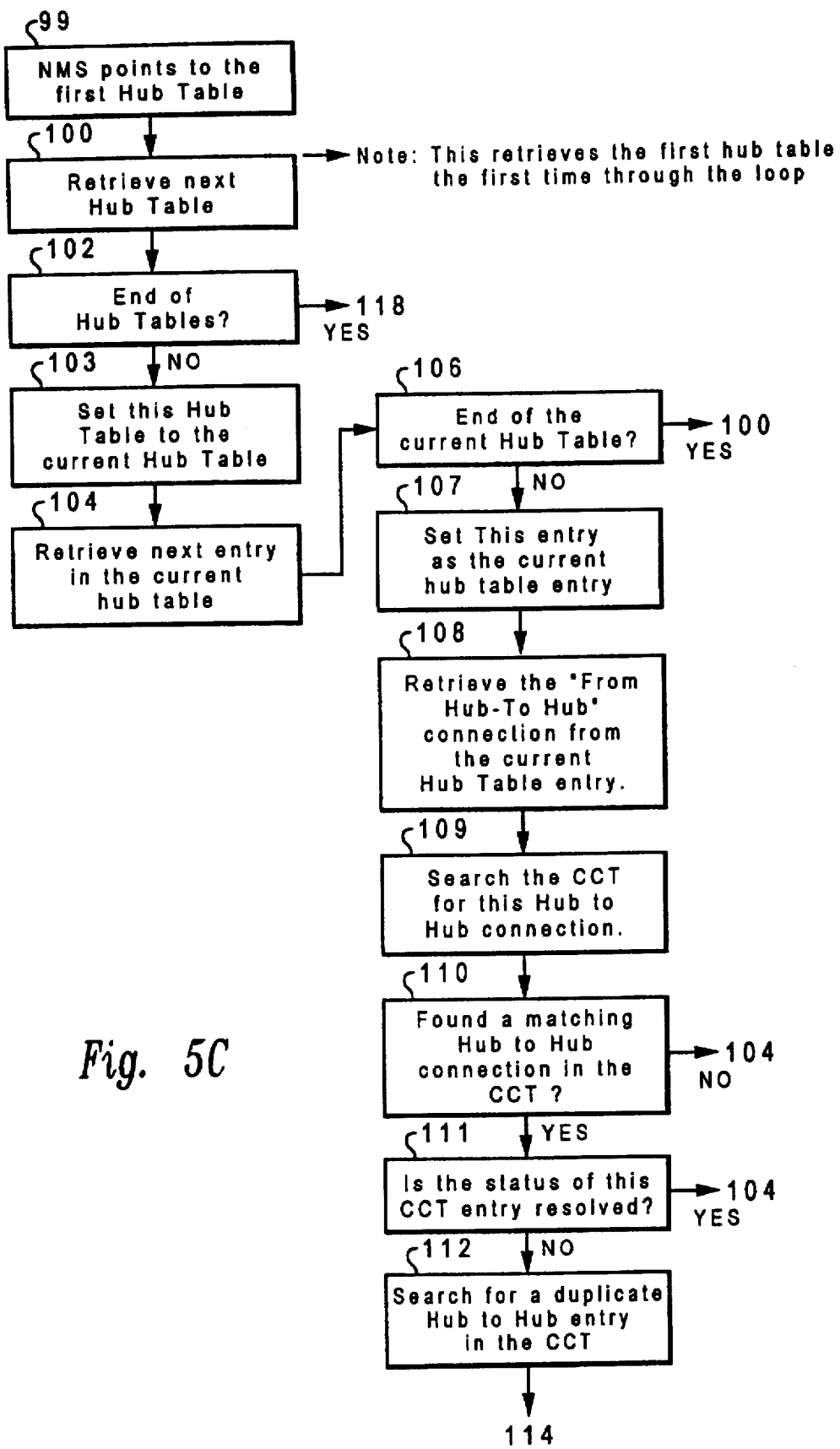
Figure 5D:
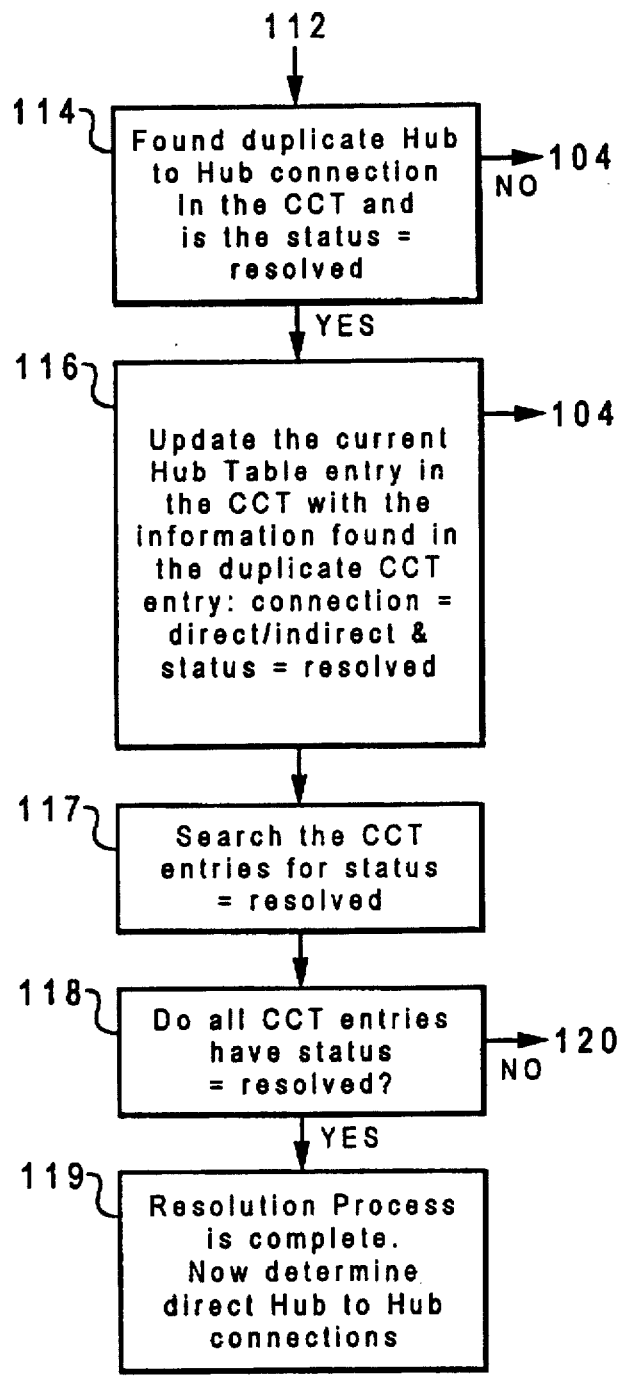
Figure 5E:
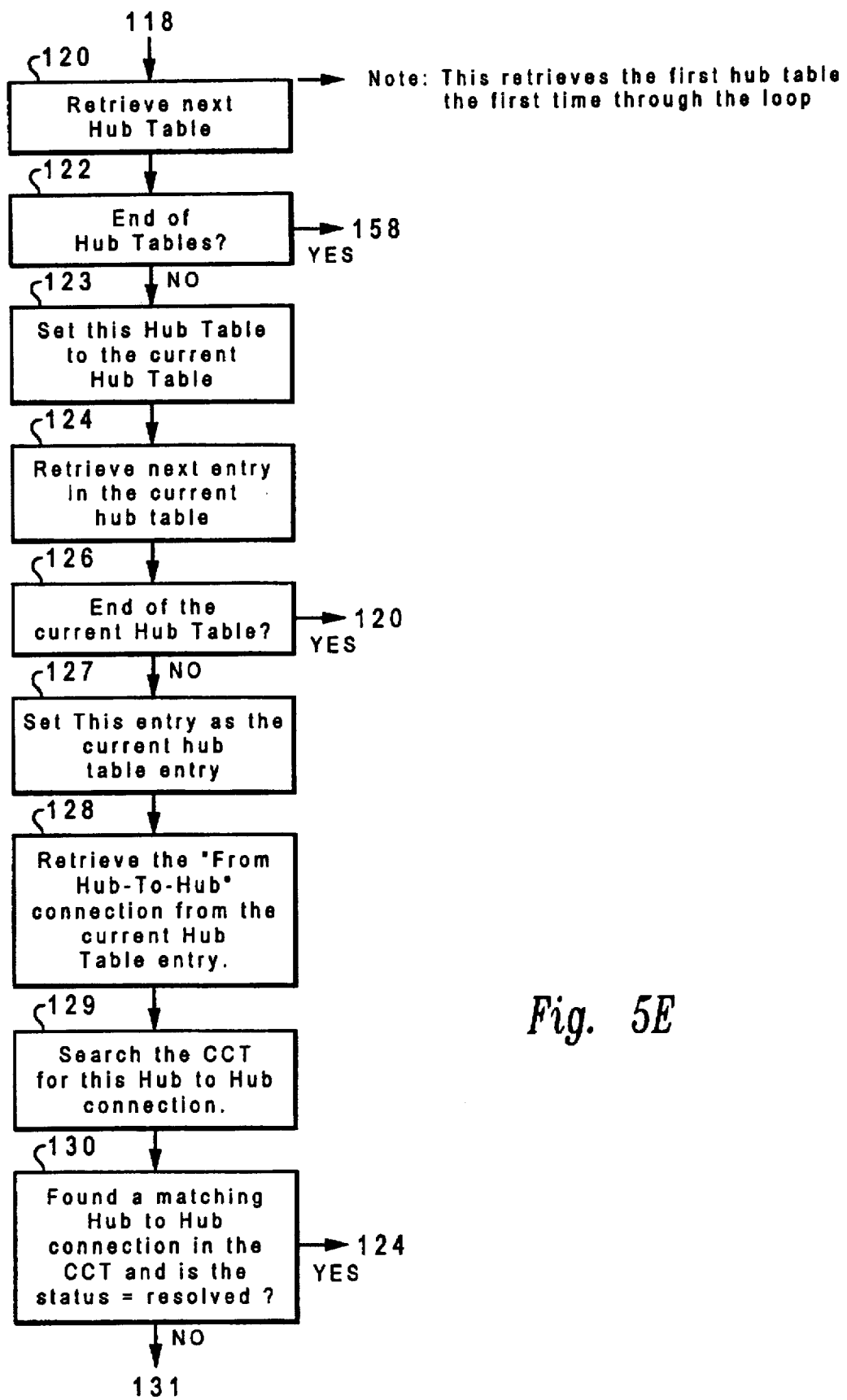
Figure 5F:
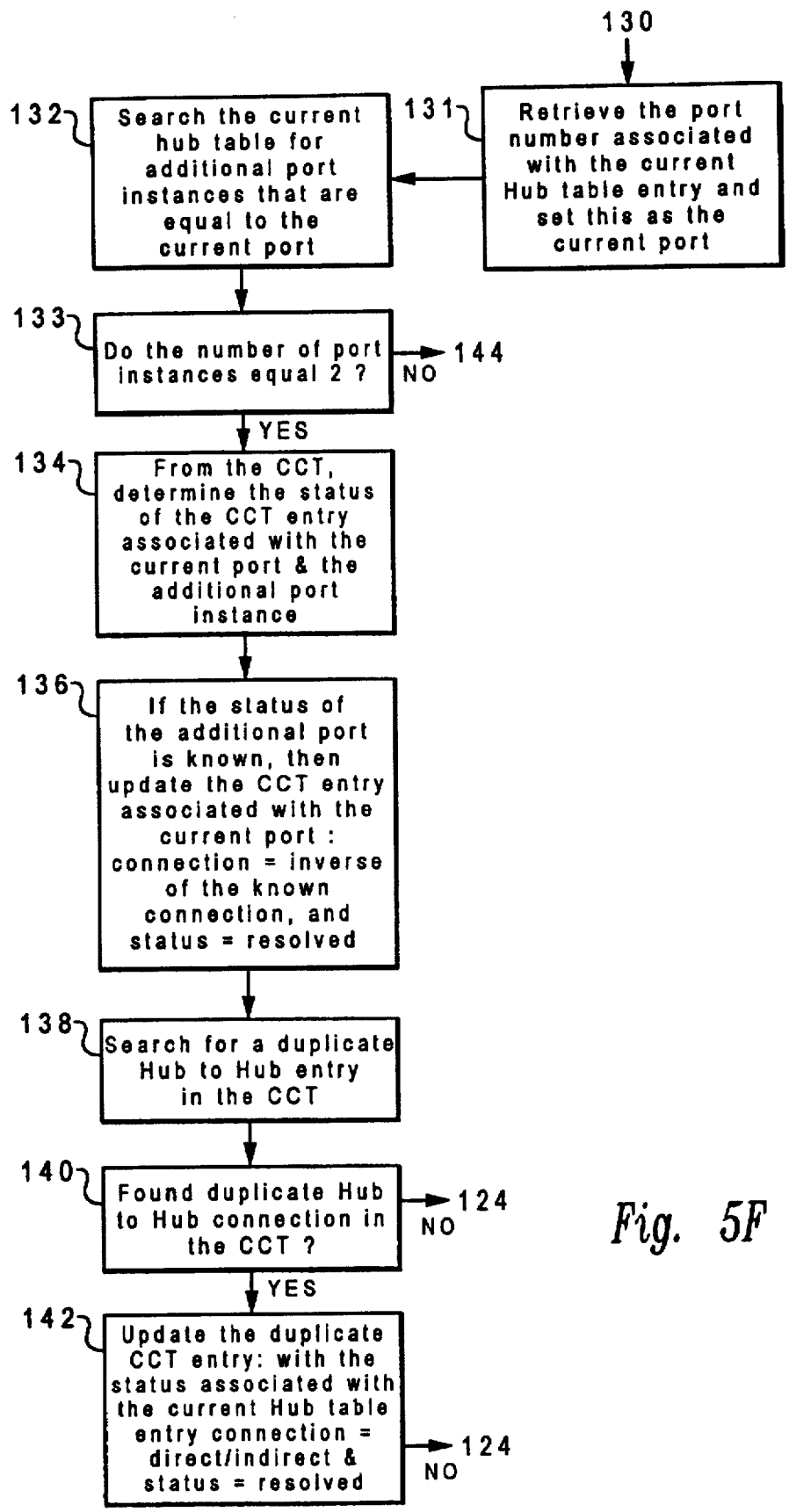
Figure 5G:
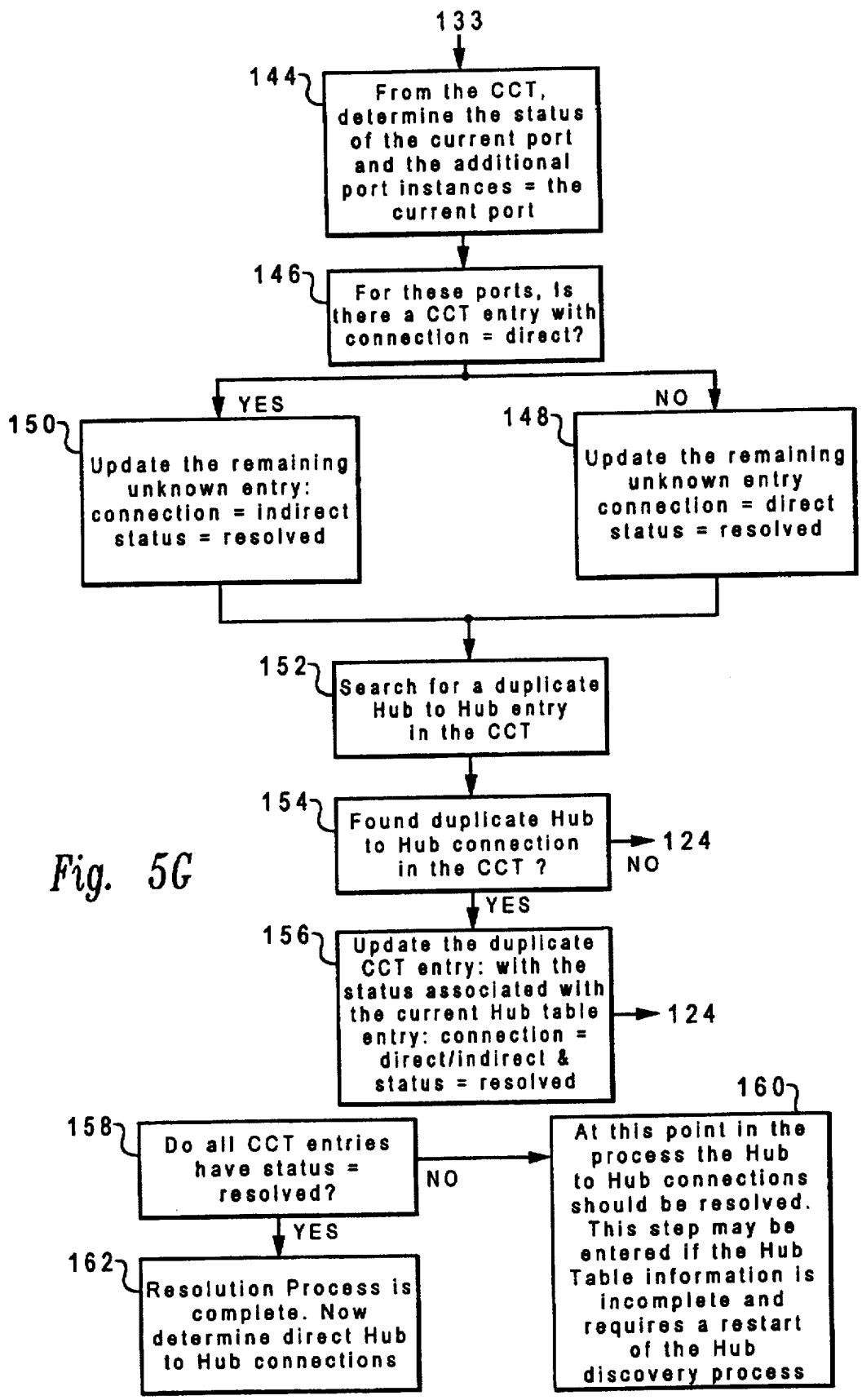

With reference now to FIG. 3, there is shown a flow diagram of the steps for performing the discovery phase of the present invention. The hub discovery process starts at step 40 and proceeds to step 42 where a selected agent selects a hub from its HubTable. The process proceeds to step 44 where the MAC address for the selected hub is written to the Source Address Match Register (SAMR). At step 46, the agent transmits an SNMP management frame to the selected hub. The selected hub will respond with a response frame, resulting in a Source Address Match (SAM) interrupt occurring at the port receiving the response frame.

In the event that a SAM interrupt does not occur, decision block 48 passes the process to block 50 where the next hub in the HubTable is selected, and then the process returns to step 44 where the MAC address of the newly selected hub is written to the SAMR. If a SAM interrupt has occurred, the process proceeds from decision block 48 to block 52. Step 52 is a redundant step to insure that there has been a match between the MAC address of the SAMR and the response frame. If a source address match was detected on the 10BaseT port, then a comparison is made between the source address and the SNMP response frame to the new source address that was detected on the 10Base Tport. If there is a match between the addresses as is shown at decision block 54, the process proceeds to block 56 where the hub corresponding to the MAC address in the SAMR is added to the connection table along with a listing of the port over which it communicated, as indicated by the SAM interrupt. If it is determined at decision block 54 that the addresses do not match, the process proceeds to block 50 where the next hub in the HubTable is selected and the process is returned to block 44.

At decision block 58 the SNMP Agent determines whether all hubs attached to the Ethernet LAN segment, as indicated by the HubTable, have been selected for the process of steps 44–48. If the decision at decision block 58 is negative, the process proceeds to step 60 where the next hub in the HubTable is selected, and the process returns to block 44. If the decision at decision block 58 is affirmative, the process ends at step 62 where the SNMP Agent sets the value of the HubTableControlEntry to DiscoveryComplete. Optionally, at step 62, the SNMP Agent may transmit a SNMP Trap Frame to the network management station to indicate that the hub discovery process is complete.

Figure 4:
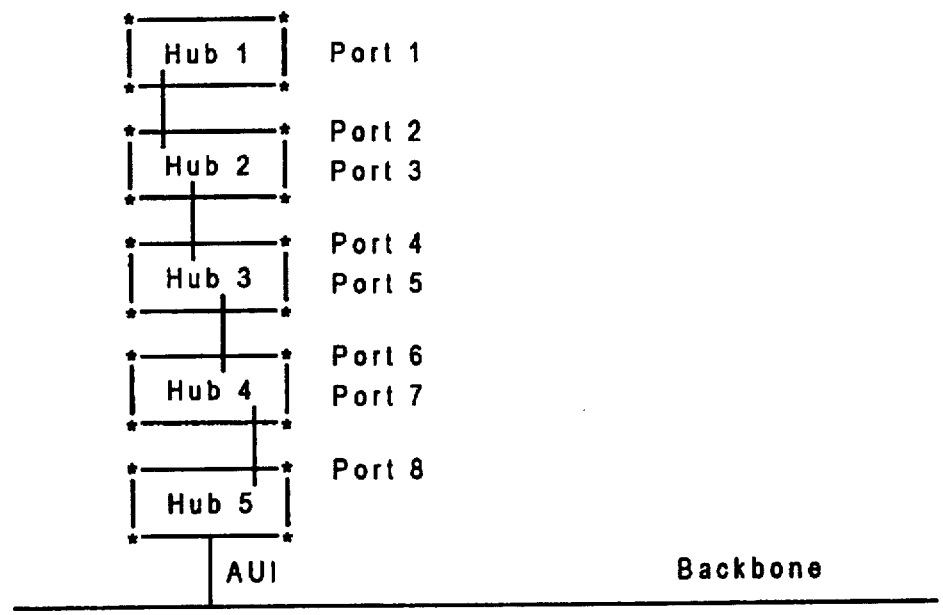
FIG. 4 depicts five hubs attached to the Ethernet LAN segment of the present invention.

The last phase of the process of the present invention is the connection correlation phase. The network management station begins this phase by transmitting an SNMP "get" frame to retrieve the contents of the connection table (MIB PortTopologyTable) from each of the network hubs. As an example, consider five hubs attached to the Ethernet LAN segment as depicted in FIG. 4. Further, consider that the network management station has retrieved the following connection tables from these five hubs.

| Table 1 | | Table 2 | | Table 3 | | Table 4 | | Table 5 | |
|---|---|---|---|---|---|---|---|---|---|
| Port | Hub | Port | Hub | Port | Hub | Port | Hub | Port | Hub |
| 1 | 2 | 2 | 1 | 4 | 2 | 6 | 3 | 8 | 4 |
| 1 | 3 | 3 | 3 | 4 | 1 | 8 | 2 | 8 | 3 |
| 1 | 4 | 3 | 4 | 5 | 4 | 6 | 1 | 8 | 2 |
| 1 | 5 | 3 | 5 | 5 | 5 | 7 | 5 | 8 | 1 |

Note: (Table X corresponds to hub X)

Referring now to FIGS. 5A–5G, there is shown a flow diagram of the process for performing the Connection Correlation Phase of the present invention. The process begins at block 64 where the network management station retrieves each of the connection tables (Tables 1–5) by transmitting a "get" request management frame. At step 66, the Connection Correlation Table (CCT) is initialized by setting an entry for each hub-to-hub connection, as is indicated by the connection tables, and by setting the status of the connection type to "unresolved". At decision block 68, the process determines whether all hub tables have been searched and the process has completed the first pass of the process. If the first pass has not completed, the process proceeds to step 70 where a first (or next) hub table is selected and retrieved. At step 72, the first (or next) entry in the current HubTable is selected for processing. For example, if the HubTable for hub 1 (Table 1 ) were the current HubTable, the first entry in the table is the Port 1/Hub 2 entry.

At decision block 74 it is determined whether all entries in the current HubTable have been processed. The process proceeds to step 76 where the first (or next) hub entry in the current HubTable is retrieved. The current port is the port listed in the current entry of the current HubTable. At step 78, the CCT is searched for the retrieved hub-to-hub connection. At step 80, it is determined whether a matching hub-to-hub connection has been found in the CCT. If no matching hub-to-hub connection is found in the CCT, the process proceeds to steps 94 and 95, where the current HubTable is searched for additional port instances that are equal to the current port. At step 96, it is determined whether the current HubTable contains a single entry listing the current port (i.e., the current entry is the only entry listing the current port). For example, in Table 2 the Port 2/Hub 1 entry is the only entry in Table 2 listing port 2. Thus, if this entry were the current entry, the decision at decision block 96 would be affirmative. If, however, the Port 3/Hub 3 entry just below was the current entry, there is listed three entries of Table 2 having the port 3 listing and so the determination at decision block 96 would be negative.

If the process proceeds to step 98, it can be deduced that the hub corresponding to the current HubTable is directly connected to the hub listed in the current entry, since no other hub is communicating to the current hub via the current port. Therefore, the hub connection entry in the connection correlation table corresponding to these two hubs is updated to show a direct connection type and the status of this entry is set to "resolved". The process proceeds from step 98 by returning to step 72 to retrieve any next entry in the current HubTable.

If the decision is negative at decision block 96, the process proceeds to step 100 where the HubTable for the hub listed in the current entry is accessed and the entry in that table corresponding to the current hub is retrieved. At decision block 102 it is determined whether this retrieved entry shows a single entry in the accessed HubTable for the port of the hub listed in the current entry that is attached to the current hub.

For example, if the connection correlation table for the example was being generated, it would be determined at decision block 96 that there was not a single port entry for port 1 in Table 1 (the current HubTable). Therefore, at step 100, Table 2 would be accessed and the Port 2/Hub 1 entry would be retrieved, since it is pointed to by the current entry (Port 1/Hub 2) of Table 1. Because the current hub (Hub 1) is shown connected to port 2 of Hub 2, and because port 2 is only shown in a single entry in Table 2, the decision at decision block 102 would be affirmative and the process would proceed to step 104.

At step 104, the hub-to-hub connection entry in the CCT for the current hub and the hub listed in the current entry has been determined to be a direct connection, and the status of this entry is set to the "resolved" state. It can be deduced that the remaining hubs are connected to the current hub indirectly through this direct connection. Accordingly, the connection type for the remaining hubs to the current hub are set to an indirect connection type and the status of the hub-to-hub entries are set to the "resolved" state. The process then returns to decision block 72.

If the decision is negative at decision block 102, the current HubTable is searched for two conditions:

1) multiple instances of the current port number are listed in the current HubTable and the connection type equals indirect.

2) one instance of the current port number is listed in the current HubTable and its status is unresolved.

If these two conditions are met, then the one unresolved instance of the current port number is a direct connection. The process proceeds to step 108 where the CCT is updated. If the two conditions are not met, the process proceeds to step 109 where the CCT is updated as unresolved for the current entry. The process will then continue to return to step 72 until all entries in the current HubTable have been processed, and, similarly, the process will return to step 68 through step 74 until all HubTables have been processed, at which time the process proceeds to step 210.

At step 210, it is determined whether all connection types in the CCT have been resolved. If they have, the process ends at step 212 and the Ethernet LAN topology can then be constructed by identifying the direct hub-to-hub connections. For the example, this would result in the CCT as shown below:

| From Hub | To Hub | Connection Type | Status |
|---|---|---|---|
| 1 | 2 | direct | resolved |
| 1 | 3 | indirect | resolved |
| 1 | 4 | indirect | resolved |
| 1 | 5 | indirect | resolved |
| 2 | 3 | direct | resolved |
| 2 | 4 | indirect | resolved |
| 2 | 5 | indirect | resolved |
| 3 | 4 | direct | resolved |
| 3 | 5 | indirect | resolved |
| 4 | 5 | direct | resolved |

If all entries in the CCT have not been resolved after the first pass, the second pass must be performed, and the process proceeds to step 99. Such a second pass would be required when, for example, the tables are processed in a non-sequential order. Consider a second example where the Tables are processed as follows:

| Table 3 | | Table 5 | | Table 2 | | Table 4 | | Table 1 | |
|---|---|---|---|---|---|---|---|---|---|
| Port | Hub | Port | Hub | Port | Hub | Port | Hub | Port | Hub |
| 4 | 2 | 8 | 4 | 2 | 1 | 6 | 3 | 1 | 2 |
| 4 | 1 | 8 | 3 | 3 | 3 | 6 | 2 | 1 | 3 |
| 5 | 4 | 8 | 2 | 3 | 4 | 6 | 1 | 1 | 4 |
| 5 | 5 | 8 | 1 | 3 | 5 | 7 | 5 | 1 | 5 |

In this case, the CCT would be resolved as follows after the first pass of the process:

| From Hub | To Hub | Connection Type | Status |
|---|---|---|---|
| 3 | 2 | ? | unresolved |
| 3 | 1 | ? | unresolved |
| 3 | 4 | ? | unresolved |
| 3 | 5 | ? | unresolved |
| 5 | 4 | direct | resolved |
| 5 | 3 | indirect | resolved |
| 5 | 2 | indirect | resolved |
| 5 | 1 | indirect | resolved |
| 2 | 1 | direct | resolved |
| 2 | 3 | ? | unresolved |
| 2 | 4 | ? | unresolved |
| 2 | 5 | ? | unresolved |
| 4 | 3 | ? | unresolved |
| 4 | 2 | ? | unresolved |
| 4 | 1 | ? | unresolved |
| 1 | 2 | direct | resolved |
| 1 | 3 | indirect | resolved |
| 1 | 4 | indirect | resolved |
| 1 | 5 | indirect | resolved |

Because many connections remain unresolved, the process proceeds to the second pass at step 99.

Block 100 indicates that the process of steps 100–106 are performed for each HubTable because the next hub table is retrieved. Decision block 102 determines if the end of the HubTables has been reached. Step 103 sets the retrieved HubTable as the current one. Block 104 indicates that the process of steps 104–116 are performed for every entry in the current HubTable because the next entry is retrieved. At step 106, when the end of a HubTable is reached, the next HubTable is retrieved and the process returns to step 100. At step 107, the retrieved entry is set as the current one. At step 108, the current entry is selected from the HubTable and the CCT is searched for this connection at Step 109. If an entry is found, as shown at step 110, and if the current entry is unresolved as is determined at decision block 111, the process proceeds to decision block 114 where it is determined whether a duplicate entry for the connection of the current hub and the hub listed in the current entry is found in the CCT that has a resolved status. If a duplicate entry is found, this information can be used to update the CCT entry for the current hub, as shown at step 116.

If the second pass has been performed on all HubTables, the process proceeds to block 117, where all entries of the CCT are searched for a resolved status, and then to decision block 118. If all connections in the CCT have been resolved, the process terminates at step 119 and the Network Management Station can now scan the direct connections in the CCT to determine the actual hub-to-hub connections. Moreover, the Network Management Station can graphically portray the connections on a display. On the other hand, if all connections have not been resolved in the CCT, the process would proceed to step 120. This would occur in our second example where, after the second pass of the process flow, not all entries of the CCT have been resolved. For the example, the CCT would be listed as follows:

| From Hub | To Hub | Connection Type | Status |
|---|---|---|---|
| 3 | 2 | ? | unresolved |
| 3 | 1 | indirect | resolved |
| 3 | 4 | ? | unresolved |
| 3 | 5 | indirect | resolved |
| 5 | 4 | direct | resolved |
| 5 | 3 | indirect | resolved |
| 5 | 2 | indirect | resolved |
| 5 | 1 | indirect | resolved |
| 2 | 1 | direct | resolved |
| 2 | 3 | ? | unresolved |
| 2 | 4 | ? | unresolved |
| 2 | 5 | indirect | resolved |
| 4 | 3 | ? | unresolved |
| 4 | 2 | ? | unresolved |
| 4 | 1 | indirect | resolved |
| 1 | 2 | direct | resolved |
| 1 | 3 | indirect | resolved |
| 1 | 4 | indirect | resolved |
| 1 | 5 | indirect | resolved |

The third pass of the connection correlation process starts at step 120, which indicates that the third pass process is performed on all HubTables for the Ethernet LAN segment. At decision block 122 it is determined whether all HubTables have been processed in the third pass. Step 124 indicates that all entries in the current HubTable will be processed. If the last entry has been already processed, the decision block 126 returns the process to step 120. At step 128, the selected entry is retrieved from the current HubTable. At decision block 130, it is determined whether the connection between the current hub and the hub listed in the current entry has been resolved in the CCT. If it has, the process returns to step 124 where a next entry is retrieved from the HubTable. If the connection has not been resolved in the CCT, the process proceeds to decision block 132. There, the current HubTable entry is checked to determine if the number of port instances is equal to two. If the port listed in the current entry has only two instances in the current HubTable, the process proceeds to step 134, where the status for each of these port instances is retrieved from the CCT. If one port of the pair has a resolved status, then the other port of the pair will be updated in the CCT at step 136. The connection type for the second port of the pair can be derived because a port can have only one direct connection. Therefore, the second port of the pair will indicate a connection type opposite from that indicated by the first port of the pair. (e.g., a direct connection on the first port of the pair resolves a connection type on the second port of the pair as an indirect connection.)

At step 138, the CCT is searched for a duplicate entry of the hub-to-hub connection shown in the current entry. At decision block 140, the process returns to step 124 if a duplicate entry is not found, and to step 142 if such an entry is found. At step 142, the duplicate CCT entry is updated with the same connection type as shown in the current entry and its status is resolved.

If the decision at decision block 132 indicates that the number of instances of the port is not equal to two, the process proceeds to step 144 where the status of all hubs attached to the port listed in the current entry are retrieved from the CCT. At step 146–150 the status of all the remaining unresolved entries in the CCT are set to the appropriate connection type. Because a port can have only one direct connection, the unknown connection can be derived from the known connection types. For example, if one of the known port connections is direct, then all of the other connections must be indirect. If all of the known connections are indirect, then the remaining port must be the direct connection. Also, duplicate entries in the CCT are also resolved in steps 152–156.

If the last HubTable has been processed in the third pass, the decision at decision block 122 passes the process to steps 158–162 where the process ends. The CCT would then be completely resolved and would be listed as follows:

| From Hub | To Hub | Connection Type | Status |
|---|---|---|---|
| 3 | 2 | direct | resolved |
| 3 | 1 | indirect | resolved |
| 3 | 4 | direct | resolved |
| 3 | 5 | indirect | resolved |
| 5 | 4 | direct | resolved |
| 5 | 3 | indirect | resolved |
| 5 | 2 | indirect | resolved |
| 5 | 1 | indirect | resolved |
| 2 | 1 | direct | resolved |
| 2 | 3 | direct | resolved |
| 2 | 4 | indirect | resolved |
| 2 | 5 | indirect | resolved |
| 4 | 3 | direct | resolved |
| 4 | 2 | indirect | resolved |
| 4 | 1 | indirect | resolved |
| 1 | 2 | direct | resolved |
| 1 | 3 | indirect | resolved |
| 1 | 4 | indirect | resolved |
| 1 | 5 | indirect | resolved |

Thereafter, the Network Management Station can scan the direct connections shown in the CCT to determine the actual hub-to-hub connections and graphically portray the connections on a video display at step 162.

While the invention has been particularly shown and described with reference to a preferred embodiment, it will be understood by those skilled in the art that various changes in form and detail may be made therein without departing from the spirit and scope of the invention.

APPENDIX

The following is the ASN.1 definition for the 8224HubTable:

```
-- *----------------------------------------------------------------
-- * The Hub Table is created by the LNM/6000 application.
-- * The table contains a list of Hubs
-- * that LNM/6000 has discovered during its topology discovery process
-- * that are a part of this Ethernet segment.  The table contains
-- * both the IP address and the MAC address for each hub.
-- *----------------------------------------------------------------

8224HubTable OBJECT-TYPE
    SYNTAX   SEQUENCE of 8224HubTableEntry
    ACCESS   not-accessible
    STATUS   mandatory
    DESCRIPTION
         "A table that contains the IP address and MAC address of
         Hubs that were discovered on this Ethernet Segment."
    ::= { 8224-PORT-INFO-GROUP 5 }

8224HubTableEntry OBJECT-TYPE
    SYNTAX   8224HUBTableEntry
    ACCESS   not-accessible
    STATUS   mandatory
    DESCRIPTION
         "An entry containing the IP & MAC addresses of Hubs discovered
         on this Ethernet Segment."
    INDEX { 8224HubTableIndex }
```

```
1          ::= { 8224HubTable 1 }
2
3       8224HUBTableEntry ::=
4          SEQUENCE {
5              8224HubTableIndex
6                  INTEGER,
7              8224HubIPAddress
8                  IpAddress,
9              8224HubMACAddress
10                 PhysAddress
11         }
12
13      8224HubTableIndex OBJECT-TYPE
14         SYNTAX   INTEGER
15         ACCESS   read-only
16         STATUS   mandatory
17         DESCRIPTION
18             "The entry in the Hub table."
19         ::= { 8224HUBTableEntry 1}
20
21      8224HubIPAddress OBJECT-TYPE
22         SYNTAX   IpAddress
23         ACCESS   read-only
24         STATUS   mandatory
25         DESCRIPTION
26             "The IP Address of a hub that was discovered on this
27             Ethernet Segment."
28         ::= { 8224HUBTableEntry 2}
```

```
1   8224HubMACAddress OBJECT-TYPE
2       SYNTAX   PhysAddress
3       ACCESS   read-only
4       STATUS   mandatory
5       DESCRIPTION
6           "The MAC Address of a hub that was discovered on this
7           Ethernet Segment."
8       ::= { 8224HubTableEntry 3 }
9
10  ******************************
11  8224HubTableControlEntry
12  ******************************
13  The following is the ASN.1 definition for the 8224HubTableControl Entry:
14
15  8224HubTableControlEntry OBJECT-TYPE
16      SYNTAX   INTEGER {
17          Unknown(1),
18          Invalid(2),
19          StartDiscovery(4),
20          DiscoveryComplete(5)
21      }
22      ACCESS   read-write
23      STATUS   mandatory
24      DESCRIPTION
25          "Controls the validity of the information in the Hub Table."
26      ::= { 8224-PORT-INFO-GROUP 6 }
27
28  ******************************
```

```
1    8224PortTable
2    ******************************
3    The following is the ASN.1 definition for the 8224PortTable:
4
5    -- *----------------------------------------------
6    -- * The Port Topology table is also part of the Port_Info_Group
7    -- * The purpose of the table
8    -- * is to provide to the NMS information about the types of
9    -- * attachments to the ports on the 8224. Specifically, the
10   -- * identification of other concentrators attached to the
11   -- * 8224 will enable the LNM/6000 application to build/display an
12   -- * accurate topology map.
13   -- *----------------------------------------------
14
15   8224PortTopologyTable OBJECT-TYPE
16       SYNTAX   SEQUENCE of 8224PortTopologyEntry
17       ACCESS   not-accessible
18       STATUS   mandatory
19       DESCRIPTION
20           "A table that contains information about devices attached to
21           ports on the 8224."
22       ::= { 8224-PORT-INFO-GROUP 4 }
23
24   8224PortTopologyEntry OBJECT-TYPE
25       SYNTAX   8224PORTTopologyEntry
26       ACCESS   not-accessible
27       STATUS   mandatory
28       DESCRIPTION
```

```
            "An entry containing the objects to describe the devices
             attached to the ports of the 8224."
         INDEX { 8224GroupIndex, 8224PortIndex }
         ::= { 8224PortTopologyTable 1 }

8224PORTTopologyEntry ::=
         SEQUENCE {
             8224GroupIndex
                 INTEGER,
             8224PortIndex
                 INTEGER,
             8224HubMACAddress
                 PhysAddress,
             8224PortAttachmentType
                 INTEGER,
             8224PortDescriptor
                 DisplayString
             }

8224GroupIndex OBJECT-TYPE
         SYNTAX   INTEGER
         ACCESS   read-only
         STATUS   mandatory
         DESCRIPTION
             "The group within the 8224. This index is equivalent to the
              rptrPortGroupIndex. This value is never greater than
              rptrGroupCapacity."
         ::= { 8224PORTTopologyEntry 1}
```

```
8224PortIndex OBJECT-TYPE
    SYNTAX   INTEGER
    ACCESS   read-only
    STATUS   mandatory
    DESCRIPTION
        "The port in the group within the 8224. This index is equivalent to
    the rptrPortIndex. This value is never greater than rptrGroupPortCapacity."
    ::= { 8224PORTTopologyEntry 2}

8224HubMACAddress OBJECT-TYPE
    SYNTAX   PhysAddress
    ACCESS   read-only
    STATUS   mandatory
    DESCRIPTION
        "The MAC Address of the hub that was discovered on this Port."
    ::= { 8224PORTTopologyEntry 3}

8224PortAttachment OBJECT-TYPE
    SYNTAX   INTEGER {
            Other(1),        -- Bridge, Router, Workstation, unknown, etc.
            ManagedRepeater(2),     -- Device implementing RFC 1516
            IBM ManagedRepeater(3), -- Device implementing RFC 1516 & IBM 8224 MIB
            8250Hub(4)       -- Device implementing the 8250 MIB
            }
    ACCESS   read-only
    STATUS   mandatory
```

```
1   DESCRIPTION
2       "Identifies the device attached with the port in the specified
3       group. At this time only the 10BT ports are supported.
4       NOTE - Repeaters will be identified by responding successfully
5           to get requests to objects in the Ethernet Repeater MIB
6           (RFC 1516).
7       NOTE - 8250 Hubs will be identified by responding successfully
8           to get requests to objects in the 8250 (Chipcom?) MIB."
9   ::= { 8224PORTTopologyEntry 4}
10
11  8224AttachmentDescr OBJECT-TYPE
12      SYNTAX   DisplayString (SIZE (0..255))
13      ACCESS   read-write
14      STATUS   mandatory
15  DESCRIPTION
16      "The System descriptive information from the MIB in the workstation
17      attached to this port. The description will take the following
18      form:
19      1) For non-repeaters (i.e. workstations, bridges, routers, etc.)
20          this field contains the text from the sysDescr object that is
21          part of MIB II.
22      2) For IBM and non-IBM managed repeaters this field contains
23          the value of rptrGroupDescr(RFC 1516). The manufacturer's name
24  version number, etc. resides in this field.
25      3) For the 8250 MIB the value of the modDescr object (8250 MIB) will be
26  stored in this field.
27      4) This field will contain the string "unknown" for those devices
28          that do not contain SNMP Agents."
```

```
        ::= { 8224PORTTopologyEntry 5}

*********************
8224HubTableTrap
*********************
The following is the ASN.1 definition for the 8224HubTableTrap:

8224HubTableTrap TRAP-TYPE
    ENTERPRISE  ibm8224
    VARIABLES   { 8224HubTableControlEntry }  -- indicates that the HUB
                                              -- discovery process is complete
    DESCRIPTION
        "This trap is generated when the 8224 completes the
        Hub Discovery process.
    ::= 15
```

What is claimed is:

1. A method of determining a LAN bus segment topology, said method comprising the steps of:

identifying each of a plurality of hubs attached to a LAN bus segment, wherein each of said plurality of hubs includes a plurality of identifiable ports;

generating a plurality of connection tables that are each associated with a respective one of the plurality of hubs, wherein a connection table associated with a selected hub lists all other hubs among the plurality of hubs and an identifiable port of the selected hub through which each other hub among the plurality of hubs communicates with the selected hub; and generating a single correlation table from the plurality of connection tables by merging the associated connection tables for all identified hubs, said single correlation table indicating whether each hub attached to the LAN bus segment has a direct or an indirect physical connection with every other hub among the plurality of hubs.

2. The method of determining LAN bus segment topology according to claim 1, further comprising the step of forming an address table that indicates an address for each identified hub.

3. The method of determining LAN bus segment topology according to claim 2, wherein the address table further comprises a control variable indicating the state of the method.

4. The method of determining LAN bus segment topology according to claim 2, further comprising the step of entering the address of one of the identified hubs from the address table to a source address match register, wherein a source address match interrupt is generated when a response frame is received by a selected hub has a source address matching the address residing in the source address match register.

5. The method of determining LAN bus segment topology according to claim 1, further comprising the step of utilizing the correlation table to generate a network topology map depicting the physical topology of the LAN bus segment.

6. The method of claim 1, wherein said plurality of hubs includes a first hub and a second hub, said step of generating a plurality of connection tables comprising the steps of:

transmitting a management request requiring a response frame from said first hub to said second hub; and in response to receipt at said first hub of a response frame from said second hub, recording in said connection table of said first hub an indication of which port of said first hub received said response frame.

7. The method of claim 6, said method further comprising the steps of:

loading an address of said second hub in a source address match register within said first hub;

in response to receipt of a response frame at said first hub, comparing an address indicated by said response frame with said address in said source address match register; and in response to a match between said address indicated by said response frame and said address in said source address match register, issuing a source address match interrupt that specifies said port of said first hub that received said response frame.

8. A method of determining a LAN bus segment topology, said method comprising the steps of:

(a) identifying every hub attached to a LAN bus segment and determining each hub's addressing information including an address, said identified hubs including a first hub and a second hub;

(b) transmitting a management request requiring a response frame from said first hub over the LAN bus segment to the second hub;

(c) receiving a response frame to said management request from the second hub, wherein the response frame includes the address of the second hub;

(d) determining if a source address match interrupt occurs in response to receiving the response frame, wherein the source address match interrupt occurs when the response frame was received on a port of the first hub, and wherein the source address match interrupt identifies the second hub as transmitting the response frame on the port;

(e) repeating steps (b)–(d) utilizing every identified hub other than said first hub as the second hub;

(f) generating a topology table for the first hub having an entry for each hub transmitting a response frame to the first hub that resulted in a source address match interrupt, each entry indicating which port of the first hub received the response frame;

(g) repeating steps (b)–(f) utilizing every other identified hub as the first hub; and (h) generating a correlation table that indicates whether said first hub and said second hub have a direct or an indirect physical connection, wherein the correlation table is generated by merging the topology tables for all identified hubs.

9. The method of determining LAN bus segment topology according to claim 8, further comprising the step of forming an address table that indicates an address for each identified hub.

10. The method of determining LAN bus segment topology according to claim 9, wherein the address table further comprises a control variable indicating the state of the method.

11. The method of determining LAN bus segment topology according to claim 9, further comprising the step of entering the address of one of the identified hubs from the address table to a source address match register, wherein the source address match interrupt is generated when a received frame has a source address matching the address residing in the source address match register.

12. The method of determining LAN bus segment topology according to claim 8, further comprising the step of utilizing the topology table to generate a network topology map depicting the physical topology of the LAN bus segment.

13. A system for determining LAN bus segment topology comprising:

a plurality of network hubs attached to a LAN bus segment, wherein each of said plurality of network hubs has an address and can transmit and receive frames, including frames containing standardized management information that are transmitted in response to management request frames, wherein each of said plurality of network hubs has a plurality of identifiable ports;

a network management station that utilizes management request frames to identify every network hub attached to the LAN bus segment and determines each hub's addressing information including an address;

a source address match register associated with a first network hub among the plurality of network hubs, wherein said source address match register contains an address of a second identified network hub among the plurality of network hubs and generates a source address match interrupt when a response frame addressed from the second network hub is received at an identified port of the first network hub, said source address match interrupt identifying the port of the first network hub receiving the response frame and the address of the second network hub;

a network hub agent associated with the first network hub that transmits a management request frame, which requires a response frame, over the LAN bus segment to the second network hub, wherein the network hub agent determines if a source address match interrupt is generated in response to receiving a response frame to the transmitted management request frame, and further wherein the network hub agent generates a connection table in association with the first network hub, wherein the connection table associated with the first network hub lists all other network hubs among the plurality of network hubs and an identifiable port of the first network hub at which each other hub among the plurality of network hubs communicates with the first network hub; and a processor for generating a single correlation table from every generated connection table for the plurality of network hubs, wherein the correlation table indicates whether each network hub attached to the LAN bus segment has a direct or an indirect physical connection with every other network hub among the plurality of hubs by merging all of the generated connection tables.

14. The system for determining LAN bus segment topology according to claim 13, wherein the network hub agent generates an address table that indicates an address for each identified hub.

15. The system for determining LAN bus segment topology according to claim 14, wherein the address table further comprises a control variable indicating the state of the system.

16. The system for determining LAN bus segment topology according to claim 14, wherein the address contained in the source address match register is an address transferred from the address table.

17. The system of determining LAN bus segment topology according to claim 13, further comprising means for comparing the address of the received response frame with the address contained in the source address match register.

18. The system of determining LAN bus segment topology according to claim 13, further comprising means for utilizing the correlation table to generate a network topology map depicting the physical topology of the LAN bus segment.

* * * * *

UNITED STATES PATENT AND TRADEMARK OFFICE
CERTIFICATE OF CORRECTION

PATENT NO.   : 5,706,440
DATED        : January 6, 1998
INVENTOR(S)  : Compliment et al.

It is certified that error appears in the above-indentified patent and that said Letters Patent is hereby corrected as shown below:

Column 6, lines 7-10: change under Table 4 "6 8 6 7" to --6 6 6 7--

Under Attorney, Agent or Firm: change "Bardley" to --Bradley--

Signed and Sealed this

Twenty-fourth Day of March, 1998

*Attest:*

BRUCE LEHMAN

*Attesting Officer*   *Commissioner of Patents and Trademarks*